Dec. 15, 1925.    1,565,998
C. H. GLAZE
AUTO SIGNAL
Filed Nov. 20, 1923    2 Sheets-Sheet 1
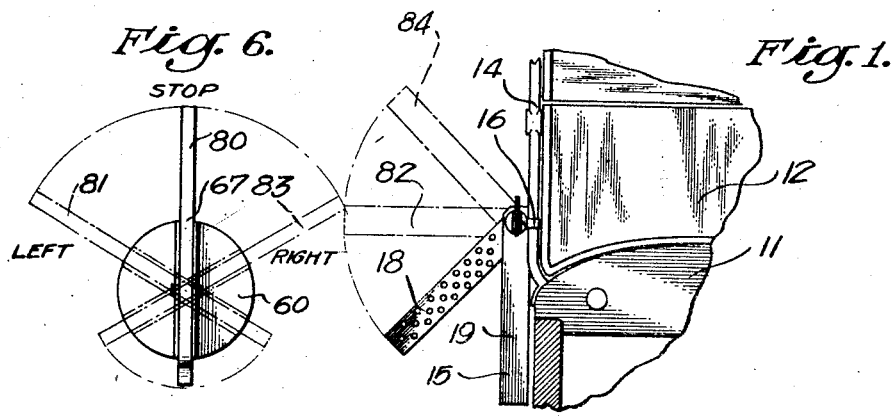
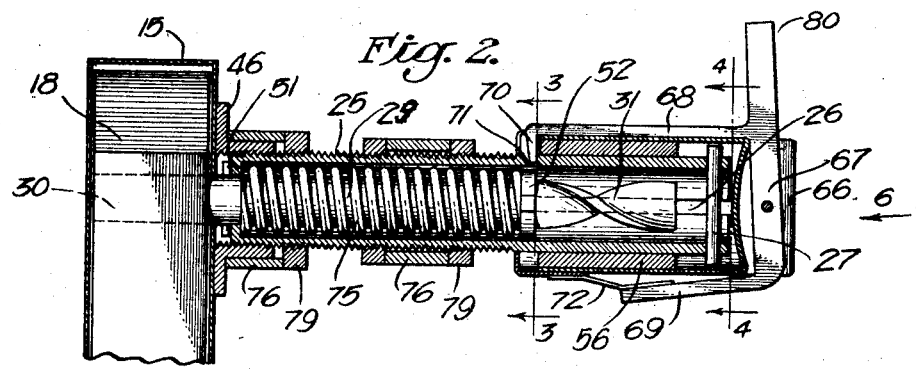
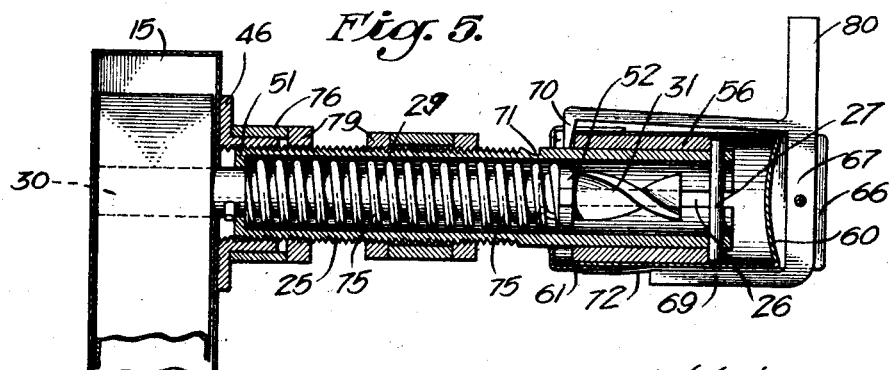
INVENTOR:
CLIFFORD H. GLAZE,
BY
Graham Harris
ATTORNEYS.

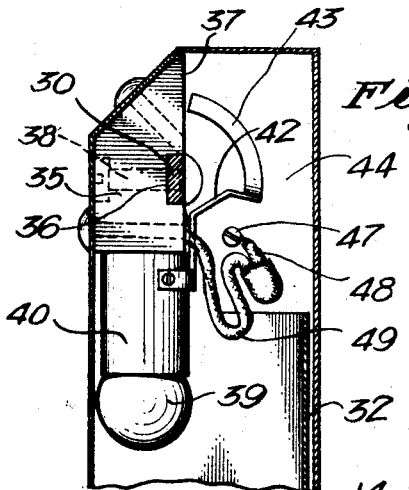
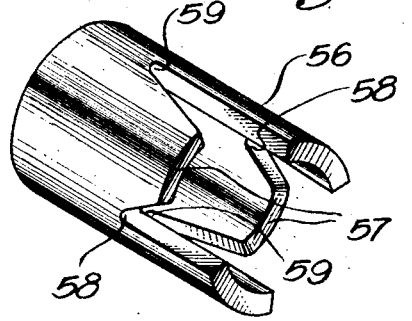
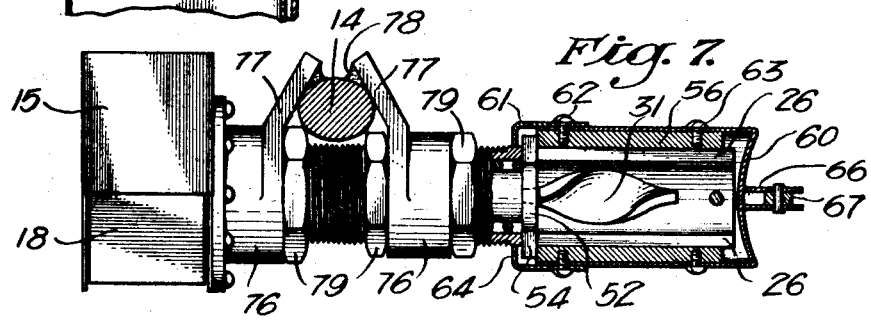
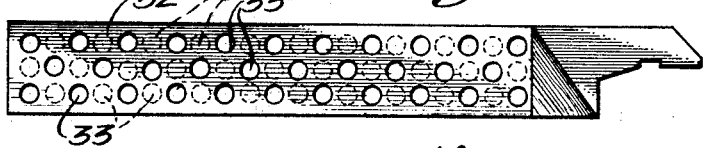
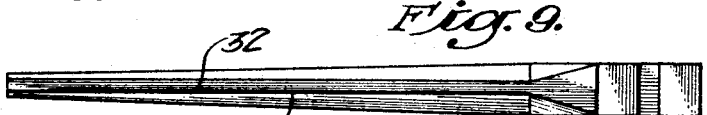
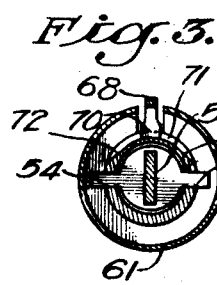
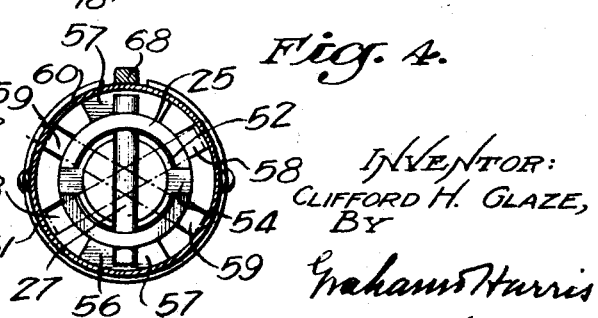

Patented Dec. 15, 1925.

1,565,998

UNITED STATES PATENT OFFICE.

CLIFFORD H. GLAZE, OF LONG BEACH, CALIFORNIA.

AUTO SIGNAL.

Application filed November 20, 1923. Serial No. 675,823.

*To all whom it may concern:*

Be it known that I, CLIFFORD H. GLAZE, a citizen of the United States, residing at Long Beach, in the county of Los Angeles, State of California, have invented a new and useful Auto Signal, of which the following is a specification.

This invention relates to signaling devices and relates more particularly to signaling devices which may be used on vehicles to facilitate the operator signaling his intended movements to other vehicles.

Because of the great number of vehicles travelling on public thoroughfares, especially in the larger cities, it has become necessary, in order to avoid accidents, and congestion to devise a signaling system by which the operator of one vehicle may signal his intentions to the operators of other vehicles and also to pedestrians.

A system of signaling which is recognized in almost every city in the United States is by the extension of the operator's arm at the side of the vehicle, his intended movement being evidenced by the position thereof. A diagonally downwardly extension of the operator's arm indicates that he intends to slow or stop the vehicle; a horizontal extension of the operator's arm indicates that he intends to turn in the direction in which his arm is extended. A diagonally upward extension of the operator's arm indicates that he intends to turn in the direction opposite to the extension of his arm. Laws have become effective which compel the operators of vehicles to signal their intended movements a short time before they are made. As an instance, there are laws in certain cities compelling operators to signal turns fifty feet before reaching the turning point. The inconvenience and uncomfortableness of holding one's arm in this extended position and also the fact that it is sometimes necessary to shift gears upon approaching a crossing and this is practically impossible with only the use of one hand, has brought forth devices to overcome this obstacle in driving vehicles.

It is an object of the invention to provide an automatic signaling device in which the arm thereof may be automatically swung into any of the before mentioned positions and retained there until it is convenient to return the arm to its normal position.

It is a further object of the invention to provide in a device of this character a simple and expedient means for extending the arm of the device, this means being a manually operated catch which, when released allows mechanism to extend the arm of the device.

It is another object of the invention to provide in a device of this character a simple and easy means for setting the arm swinging mechanism so that it will swing the arm into any one of the three positions thereof as desired. This means consists of a sleeve member which may be conveniently rotated, by means of the latch member which is secured thereto into a position corresponding to the desired movement of the arm.

Further objects of the invention and the especial advantages will be made evident hereinafter.

Referring to the drawings which are for illustrative purposes only:

Fig. 1 is a diagrammatic view illustrating the utility of the invention, the signal being mounted on the windshield of an automobile.

Fig. 2 is a fragmentary sectional view showing the device in normal position.

Fig. 3 is a section taken on the line 3—3 of Fig. 2.

Fig. 4 is a section taken on the line 4—4 of Fig. 2.

Fig. 5 is a fragmentary sectional view similar to Fig. 2 showing the position of the mechanism when the arm is in a diagonally downwardly extended position.

Fig. 6 is an end view of the cover member taken as indicated by the arrow 6 of Fig. 2, showing in broken lines the various positions thereof.

Fig. 7 is a plan view of the device partially in section.

Figs. 8 and 9 are views of the arm member.

Fig. 10 is an enlarged fragmentary sectional view showing lighting arrangement for illuminating the signal arm.

Fig. 11 is an enlarged perspective view of the cam sleeve.

In Fig. 1 of the drawings, 11 indicates a portion of an automobile having a windshield 12 which is supported by a vertical brace 14. A signaling device 15 embodying the features of my invention is mounted on the support 14 by a clamp 16. The signaling arm 18 of the device is adapted to be swung into the three positions as indicated in this figure, the arm being enclosed by the housing 19 when in retracted position.

In Figs. 2 to 11 inclusive, the signal is shown in detail. The construction and operation thereof will be readily perceived from the following description.

The invention provides a barrel 25 having diametrically opposed slots 26 at one end thereof as shown and having a pin 27 extending therethrough at right angles to the axis of the sleeve, the utility of which pin will be described later. Extending through the barrel 25 as shown is a rotatable shaft 29, having a rectangular extension 30 on one end thereof and having a rectangular extension 31 twisted to form a spiral helicoid on the other end thereof. On the extension 30 is mounted the signal arm 18 and as shown in Figs. 8, 9 and 10 the arm 18 provides a sheet metal shell 32 which is perforated as shown, the holes 33 in the opposite sides of the arm being staggered in relationship to each other. Secured in the inner end of the arm 18 as shown in Fig. 10 is a fibre block 35 which has a rectangular slot 36 extending along the face 37 thereof into which slot the rectangular extension 30 of the shaft 27 passes and is secured therein by means of screws 38. A light 39 screwed in the socket 40 which is mounted on the block 35 is provided to illuminate the interior of the arm at night, the illumination being visible through the holes 33 in the shell 32. For economical purposes, a means is provided for lighting the light 39 only when the arm 18 is in extended position. Mounted on the socket 40 by any suitable means is a contact member 42, the outer end 43 of which is arcuated as shown in Fig. 10. In the side wall 44 of the housing 15 which is riveted to the flange 46 screwed on the barrel 25, is a contact in the form of a screw 47. Connected to the contact 47 is a wire 48 while the other wire 49 of the light circuit is connceted directly to the socket 40. When the arm 18 is swung in to one of the extended positions thereof, the portion 43 of the contact 42 swings into engagement with the contact 47, completing the circuit and lighting the bulb 39 and making the arm distinctly visible at night. If desired the interior of the arm 18 may be painted with luminous paint in place of providing a light therein, or in combination with the light. The shaft 29 is supported at one end by the inwardly turned flange 51 of the barrel 25 and at the other end by a runner 52 which rests on the spiral 31, the runner 52 having a hole 53 therein complementary in shape to the cross section of the spiral 31. The runner 52 has projections 54 which extend through slots 26 in the barrel 25. Slidably placed on the right end of the barrel 25 is a sleeve cam 56 which is shown in perspective in Fig. 11. The sleeve cam provides oppositely disposed faces 57, oppositely disposed slots 58 and oppositely disposed slots 59. By examining Fig. 11, it will be seen that the faces 57 and the bottoms of the slots 58 and 59 are in stepped arrangement, that is the faces 57 are in one plane, the bottom of the slots 58 are in another plane to the left of the faces 57 while the bottoms of the slots 59 are in a plane to the left of the bottom of the slots 58. Placed over the sleeve 56 is a cover 60 and a cap 61 which are held in place by screws 62 and 63, the ends of the projections 54 extending in the space between the end of the sleeve cam 56 and the flange 64 of the cap 61. Pivoted between the lugs 66 formed on the cover member 60 is a latch member 67. The member 67 provides horizontally extending arms 68 and 69, the arm 68 having a catch 70 formed at the end thereof which engages a slot 71 in the barrel 25 and the arm 69 having a leaf spring 72 mounted at the end thereof, the spring bearing against the cover member 60 for holding the catch 70 in the slot 71. The purpose of the latch member is to retain the sleeve cam 56 in the position in which it is shown in Fig. 2, against the action of a helix spring 75 which exerts a pressure thereon through the runner 52, the projections 54 of which engage the left end of the sleeve cam 56.

The clamp 16 consists of sleeve members 76 which have arms 77 formed as shown in Fig. 7. The arms are adapted to clamp the support 14 and may be adjusted by nuts 79 to suit the size of the support 14. The arms 77 also may be welded to the support at 78 to insure rigidness.

The device may be operated in the following manner:

Releasing the latch 67, which is conveniently accomplished by pulling on a lever extension 80 of the latch, disengages the catch 70 and the slot 71 and allows the cam to be forced by the spring 75 to the right until it engages the pin 27, owing to the fact that the runner 52 which travels with the sleeve cam, is non-rotatable because of the projection 54 thereof engaging the slots 26. The shaft 29 is caused to turn as the runner progresses to the right along the spiral 31 which rotation swings the arm 18. It will easily be seen that the amount the runner 52 travels to the right determines the amount of rotation of the shaft 27 and likewise the swinging of the arm. The movement of the runner is dependent upon the movement of the sleeve cam 56 so that by controlling the movement of the cam, I indirectly control the swinging of the arm. When the sleeve cam which is turnably as well as slidably mounted on the barrel is in the position shown, the latch member is vertically disposed and the faces 57 of the sleeve 56 are in alignment with the ends of the pin 27 so that the sleeve cam moves to the right until the faces 57 engage the pin 27 which allows the arm to be swung as shown by the full line in Fig. 1 and allows the device to assume the position shown in Fig. 5. By turning the sleeve cam 54 to the left so that the latch member 67 will assume the position indicated by the broken lines 81, Fig. 6, the slots 58 will be made to align with the pin 27. The sleeve cam and runner 52 will then move to the right until the pin 27 is engaged by the bottoms of the slots 58, the runner and spiral arrangement swinging the arm into a horizontal position as indicated by the broken lines 82 of Fig. 1. By swinging the latch member 67 to the right into the position indicated at 83 in Fig. 6, the slots 59 are aligned with the pin 27 and the sleeve and runner is allowed to move to the right until the pin 27 is engaged by the bottoms of the slots 59, allowing the spiral 31 to be rotated a distance sufficient to swing the arm into an upward diagonal position as indicated by the broken lines 84 of Fig. 1. To reset the device, it is necessary to push forwardly on the cover 60 until the catch 70 falls into the slot 71 which holds the mechanism in normal position until it is again released.

As shown clearly in Fig. 3, the ends of the slot 71 slope outwardly as indicated at 72. It is apparent then that when the latch member is swung either to the right or left, the catch 70 will ride outwardly on the sloped portion 72 of the slot 71 and simultaneously release itself. This arrangement makes it unnecessary to actuate the latch member when turning to the left or right, it being necessary only to rotate the latch member in the desired direction.

From the foregoing, the usefulness of my invention may be readily perceived. Not only is driving convenienced, but the danger of accidents is decreased as the operator can give all his attention to the driving of the vehicle. For example, an operator desires to make a left-hand turn. About fifty feet from the turning point, he may swing the latch member 67 to the left which automatically releases the catch and allows the arm 18 to be swung into a horizontal position. The operator may then give his entire attention to his driving having both hands to drive the vehicle and to shift gears if necessary. After the turn is made, the device may be reset and be ready for the next operation thereof.

I claim as my invention:

1. In a signaling device of the class described, the combination of: a rotatable shaft; a signaling arm secured to said rotatable shaft; means on said shaft for rotating same; a spring for actuating said rotating means; a barrel enclosing said actuating spring and said rotating means and having a housing for enclosing said signal arm secured thereto; a sleeve cam slidably mounted on said barrel for limiting the activity of said rotating means and likewise the extended position of said signaling; and clamp means secured to said barrel for mounting said device on a vehicle.

2. In a signaling device of the class described, the combination of: a rotatable shaft having a signaling arm secured thereto; means on said shaft for rotating same; a spring for actuating said rotating means; a barrel enclosing said actuating spring and said rotating means and having a housing for enclosing said signal arm secured thereto; a pin extending through said barrel; a sleeve cam slidably mounted on said barrel having steps formed therein, said steps being selectively aligned with said pin for varying the movement of said sleeve cam, said sleeve cam being associated with said rotating means in a manner to regulate the position of said arm according to the movement of said sleeve cam; and clamp means secured to said barrel for mounting said device on a vehicle.

3. In a signaling device of the class described, the combination of: a rotatable shaft having a spiral formed on one end thereof; a barrel enclosing and supporting said shaft; a signaling arm secured to said shaft; a housing mounted to said barrel for housing said signaling arm; a sleeve cam slidably placed on said barrel having steps formed therein; a pin extending through said barrel for limiting the movement of said sleeve cam according to the step of said sleeve cam engaging said pin; a runner disposed on said spiral engaging said sleeve cam; a spring located within said barrel for moving said runner along said spiral and rotating said shaft; a manually releasable catch associated with said sleeve cam for retaining said device in normal position; and a clamp member secured to said barrel for mounting said device on a vehicle.

4. In a signaling device of the class described, the combination of: a rotatable shaft having a spiral formed on one end thereof; a barrel enclosing and supporting said shaft; a signaling arm secured to said shaft; a housing mounted to said barrel for housing said signaling arm; a sleeve cam slidably placed on said barrel having steps formed therein; a pin extending through said barrel for limiting the movement of said sleeve cam according to the step of said sleeve cam engaging said pin; a runner disposed on said spiral engaging said sleeve cam; a spring located within said barrel for moving said runner along said spiral and rotating said shaft; a manually releasable catch associated with said sleeve cam for retaining said device in normal position; a clamp member secured to said barrel for mounting said device on a vehicle; and means for illuminating said arm.

5. In a signaling device of the class described, the combination of: a bracket member for mounting the device on a vehicle; a barrel having slots formed at one end thereof; a shaft extending through said barrel having a spiral formed thereon; a signaling arm secured to said shaft; means for illuminating said arm; a housing secured to said barrel for enclosing said arm; a runner movably disposed on said spiral having projections formed thereon extending through said slots in said barrel; a sleeve cam slidably placed on said barrel engaging said projections and having steps formed thereon; a cover enclosing said sleeve cam; a manually releasable latch pivoted to said cover for locking the device in normal position; a pin extending through said barrel; means for forcibly moving said runner along said spiral for swinging said arm into extended position; and means for determining the position of said arm consisting of rotating said sleeve cam to bring one of said steps into engagement with said pin as desired, thereby controlling the movement of said sleeve cam.

6. In a signaling device of the class described, the combination of: an adjustable clamp member for mounting the device on a vehicle; a barrel having slots formed at one end thereof; a shaft extending through said barrel having a spiral formed integral therewith, said shaft being supported by said barrel; a signaling arm secured to said shaft; means for illuminating said arm; a housing secured to said barrel for enclosing said arm; a runner movably disposed on said spiral having projections formed thereon, said projections extending through said slots in said barrel; a sleeve cam slidably placed on said barrel engaging said projections and having steps formed thereon; a cover enclosing said sleeve cam; a manually releasable latch pivoted to said cover for locking said device in normal position; a pin extending through said barrel; spring means for forcibly moving said runner along said spiral for swinging said signal arm into an extended position; and means for determining the position of said arm consisting of rotating said sleeve to selectively bring one of said steps into engagement with said pin thereby controlling the position of said arm by the amount of movement of said sleeve cam.

In testimony whereof, I have hereunto set my hand at Los Angeles, California, this 14th day of November, 1923.

CLIFFORD H. GLAZE.